United States Patent [19]

Ukai et al.

[11] Patent Number: 4,790,551
[45] Date of Patent: Dec. 13, 1988

[54] STEERING SYSTEM FOR MOTOR VEHICLE

[75] Inventors: Norio Ukai; Mitsuya Serizawa; Yasuharu Oyama; Yoshimi Furukawa; Masami Ogura; Tsuyoshi Sato, all of Saitama, Japan

[73] Assignee: Honda Giken Kogyo Kabushiki Kaisha, Tokyo, Japan

[21] Appl. No.: 10,457

[22] Filed: Feb. 3, 1987

[30] Foreign Application Priority Data

Feb. 12, 1986 [JP] Japan .................................. 61-19093
Feb. 12, 1986 [JP] Japan .................................. 61-19094

[51] Int. Cl.$^4$ ............................................ B62D 7/00
[52] U.S. Cl. ..................................................... 280/91
[58] Field of Search ........................................... 280/91

[56] References Cited

U.S. PATENT DOCUMENTS 4,172,396 10/1979 Larson et al. ........................... 269/45
4,671,523 6/1987 Naumann ................................ 280/91

FOREIGN PATENT DOCUMENTS 3413007 10/1985 Fed. Rep. of Germany .
58-97565 6/1983 Japan .
852544 10/1957 United Kingdom .
1248931 9/1968 United Kingdom .
1449639 10/1972 United Kingdom .
2151567 7/1985 United Kingdom .
2161437 1/1986 United Kingdom .

Primary Examiner—Kenneth R. Rice
Attorney, Agent, or Firm—Irving M. Weiner; Joseph P. Carrier; Pamela S. Burt

[57] ABSTRACT

A steering system for a motor vehicle includes a centering mechanism for establishing a neutral steering position. The steering system includes a steering wheel and a steering assembly for steering vehicle wheels in response to angular movement of the steering wheel. The centering mechanism is mounted on at least a portion of the steering assembly for establishing the neutral steering position of the steering assembly.

10 Claims, 6 Drawing Sheets

STEERING SYSTEM FOR MOTOR VEHICLE

BACKGROUND OF THE INVENTION

1. Field of the Invention

The present invention relates to a steering system for a motor vehicle.

2. Description of the Relevant Art

There is known an automotive steering system for steering both front and rear wheels of an automobile as disclosed in British Patent Publication No. 2161437A. In such a steering system, no wheel is available as a reference for adjusting wheel alignment of all four wheels since the front and rear wheels are steerable. Therefore, it has been difficult to adjust the relationship between degrees of toeing of front and rear wheels and the relationship between the degrees of toeing of right and left wheels, and hence it has been time-consuming and expensive to make such adjustments.

British Patent Publication No. 2151567A and Japanese Laid-Open Patent Publication No. 58-97565 disclose steering systems for steering both front and rear wheels on motor vehicles. In the disclosed steering systems, the output shaft of a front wheel steering device and the input shaft of a rear wheel steering device are interconnected by a linkage shaft, and a pinion is rotatably fitted over an eccentric shaft on the input shaft. The pinion has an integral eccentric member engaged by a joint member by which rear wheel tie rods are coupled to each other, the pinion being held in mesh with a fixed internal ring gear.

The disclosed systems are advantageous for the following reasons: The maximum steering angle of the rear wheels is larger when the rear wheels are steered in a direction opposite to that in which the front wheels are steered than when the rear wheels are steered in the same direction as that in which the front wheels are steered. Therefore, the steering system can provide good maneuvering response primarily in a high speed range of travel during which the automobile is usually steered, if at all, only in a relatively small angle range. On the other hand, in a low speed range during which the steering wheel is frequently turned in a relatively large angle range, the automobile can make smaller turns.

One problem of the conventional steering systems is that since the pinion can freely revolve within the ring gear through several turns, it is difficult to establish the neutral steering position of the rear wheel steering device when it is assembled or serviced.

SUMMARY OF THE INVENTION

It is an object of the present invention to provide a steering system for a motor vehicle which allows easy establishment of the neutral steering position of a steering mechanism at the time of adjusting wheel alignment or the like when the steering mechanism is assembled or serviced.

To accomplished the above object, there is provided a steering system for a motor vehicle, comprising a steering wheel, a steering assembly for steering vehicle wheels in response to angular movement of the steering wheel, and a centering mechanism mounted on at least a portion of the steering assembly for establishing the neutral steering position of the steering assembly.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Like or corresponding parts are denoted by like or corresponding reference numerals throughout several views.

Figure 1:
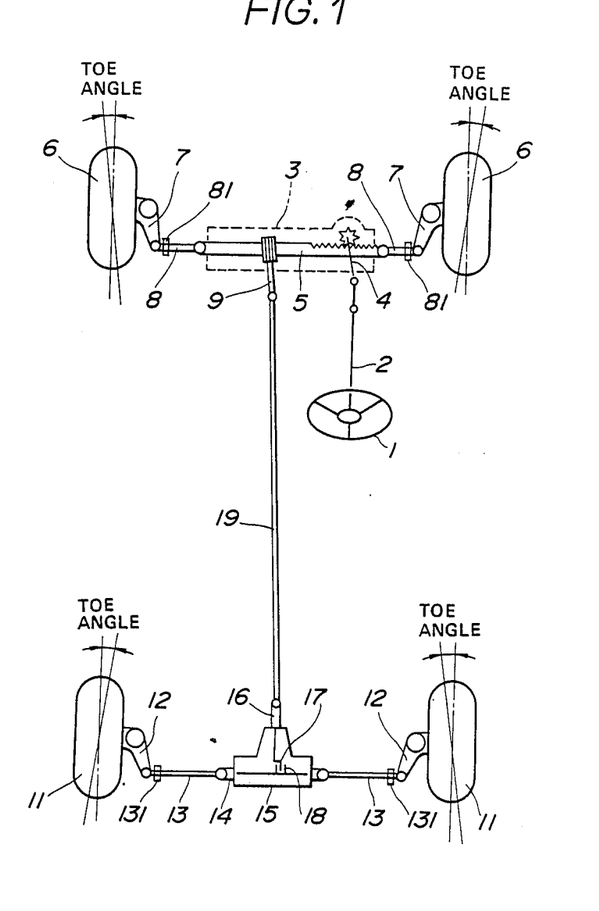
FIG. 1 is a schematic plan view of a steering assembly according to an embodiment of the present invention.

As shown in FIG. 1, a steering wheel 1 is joined to a steering shaft 2 coupled to a pinion shaft 4 installed in a rack-and-pinion front steering gear box 3. The pinion shaft 4 has a pinion meshing with the teeth of a rack shaft 5 having opposite ends coupled by tie rods 8 to respective knuckle arms 7 by which front wheels 6 are rotatably supported. The rack shaft 5 is operatively coupled to an output shaft 9 for transmitting rotation from the front wheel steering mechanism to a rear wheel steering mechanism.

Rear wheels 11 are supported respectively on knuckle arms 12 coupled by tie rods 13 to the opposite ends of a joint shaft 14 installed in a rear steering gear box 15. The gear box 15 houses therein an input shaft 16 having an eccentric shaft 17 engaging a engaging member 18 mounted on the joint shaft 14. The engaging member 18 is only movable in lateral directions by the eccentric shaft 17.

The output shaft 9 and the input shaft 16 are interconnected by a linkage shaft 19. The four tie rods 8, 13 have respective toeing adjusting screws 81, 131.

Figure 2:
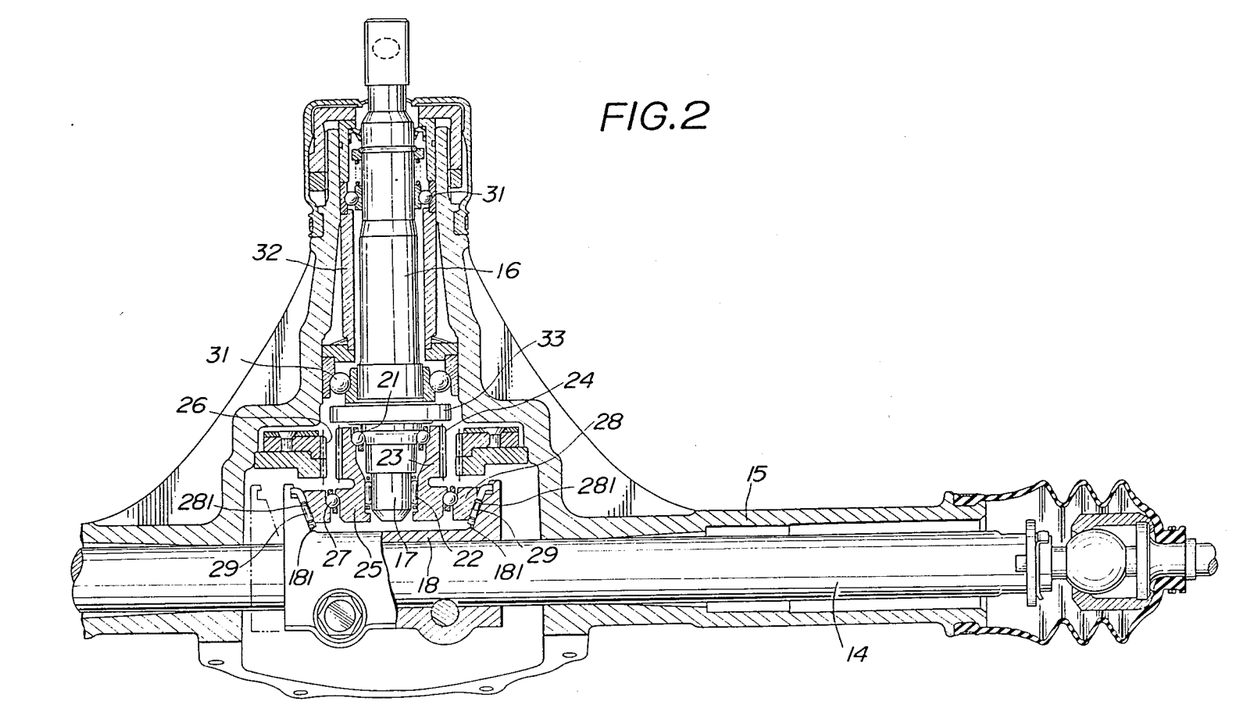
FIG. 2 is a fragmentary horizontal cross-sectional view of a rear steering gear box.
Figure 3:
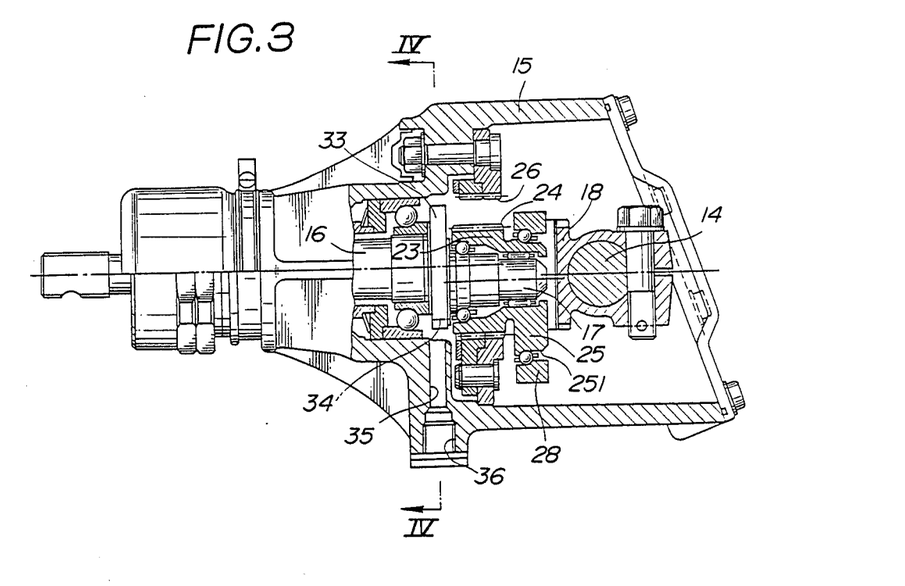
FIG. 3 is a vertical cross-sectional view of the rear steering gear box.

The internal structure of the rear steering gear box 15 is shown in detail in FIGS. 2 and 3. A cylindrical member 23 is rotatably fitted over the eccentric shaft 17 on the input shaft 16 with balls 21 and rollers 22 rotatably interposed between the eccentric shaft 17 and the cylindrical member 23. The cylindrical member 23 has on its front portion a pinion 24 meshing with an internal ring gear 26 fixedly mounted in the gear box 15. The cylindrical member 23 has on its rear portion an eccentric cam 25 over which a slide yoke 28 is relatively rotatably fitted with balls 27 therebetween. The slide yoke 28 has vertical tapered surfaces 281 on its lateral ends, and the engaging member 18 fixed to the joint shaft 14 has similar opposite vertical tapered surfaces 181, with rollers 29 interposed between the tapered surfaces 281, 181.

The input shaft 16 is rotatably supported in the gear box 15 by front and rear ball bearings 31 having respective outer races, between which a distance collar 32 is disposed.

The neutral steering position of the rear steering mechanism thus constructed is established, or the rear steering mechanism is centered, while the eccentric shaft 17 is positioned vertically below the input shaft 16, the pinion 24 is in mesh with the lowermost portion of the internal ring gear 26, and the eccentric cam 25 has its lobe 25 directed downwardly, as shown in FIG. 3.

Figure 4:
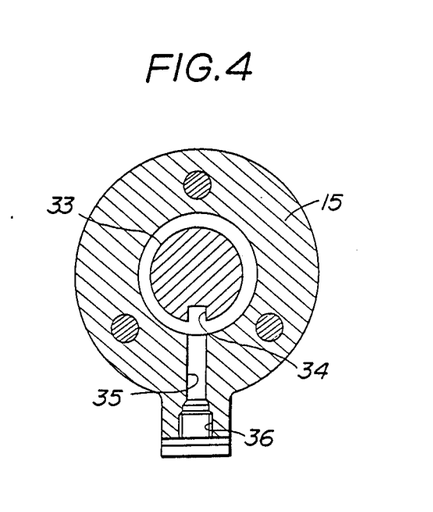
FIG. 4 is a cross-sectional view taken along IV—IV of FIG. 3.

A flange 33 is disposed on and around the rear end of the input shaft 16. As shown in FIG. 4, the flange 33 has a recess 34 defined as an engaging portion in its outer peripheral surface, the recess 34 being directed downwardly when the input shaft 16 is in the neutral steering position or is centered. The lower portion of the gear box 15 toward which the recess 34 opens in the neutral steering position has a vertical guide hole 35 defined therethrough. The lower open end of the guide hole 35 is internally threaded at 36. Under normal usage of the steering mechanism, the guide hole 35 is sealed by a plug screw (not shown) threaded in the internally threaded end of the guide hole 35.

Figures 5, 6:
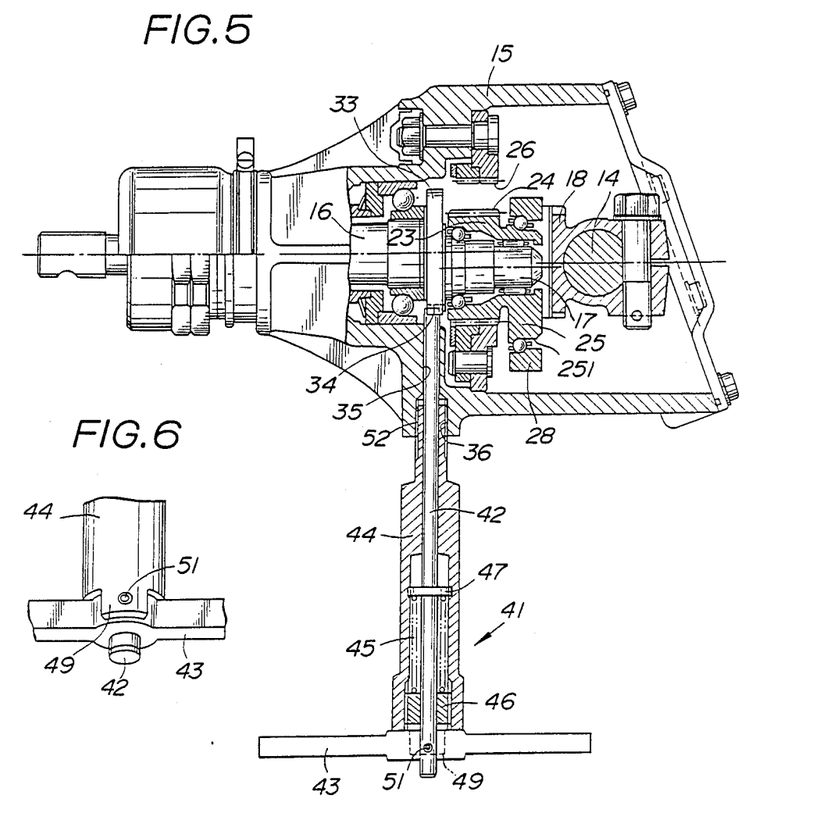
FIG. 5 is a vertical cross-sectional view showing a steering mechanism locked in a neutral position.
FIG. 6 is a fragmentary perspective view of a locking device.

FIG. 5 shows a locking device 41 comprising a lock pin 42, a lever 43, a holder 44, a coil spring 45, and a plug 46. The lock pin 42 is slidably inserted in the holder 44. The coil spring 45 is disposed under compression between a flange 47 disposed around the lock pin 42 within the holder 44 and the plug 46 threaded in the open end of the holder 44. As also shown in FIG. 6, a pair of attachment arms 49 projecting from the open end of the holder 44, the lock pin 42, and an intermediate portion of the lever 43 are interconnected by a spring pin 51. The holder 44 has an upper distal end portion externally threaded at 52 and threaded in the internally threaded portion 36 of the gear box 15.

For attaching the locking device 41 to the rear steering gear box 15, the plug screw (not shown) is removed from the guide hole 35, and the upper distal end portion of the lock pin 42 is inserted upwardly into the guide hole 35. Then, the lever 43 is turned to insert the external threaded portion 52 of the holder 44 into the internally threaded portion 36.

When the recess 34 of the flange 33 is brought into the lowermost position through angular adjustment of the input shaft 16, the upper distal end of the lock pin 42 which has been pressed against the outer peripheral surface of the flange 33 under the resiliency of the coil spring 45 is pushed into the recess 34. The input shaft 16 is now locked in the steering neutral or central position by engagement of the lock pin 42 in the recess 34. Therefore, the rear steering mechanism is locked in the neutral steering position.

Since the front and rear steering mechanisms are mechanically interconnected in the illustrated embodiment, the front steering mechanism is also locked in the neutral steering position at the same time, such as during assembly or servicing. Accordingly, with the front and rear steering mechanisms thus locked in their central positions, toeing adjustment for the front and rear wheels and spoke angle adjustment for the steering wheel 1 can easily be performed within a short period of time.

The front steering mechanism can employ the same locking device as that of the rear steering mechanism, so that the front and rear steering mechanisms can easily be centered and brought into phase with each other on an assembly line for motor vehicles.

In the aforesaid embodiment, the motor vehicle with the front and rear steering mechanisms being mechanically interconnected for steering the front and rear wheels has been shown and described. However, the principles of the present invention are also applicable to motor vehicles in which the rear wheel steering is electrically or hydraulically controlled on the basis of the vehicle speed and the front wheel steering angle, and further applicable to ordinary motor vehicles with only front wheels steerable. The portion in which the lock pin engages is not limited to a member in the steering gear box, but may be on the linkage shaft 19. The locking device may be any desired structure. For example, a projection may be employed as an engaging portion for engagement with the lock pin.

With the afosaid embodiment, since the steering mechanism can be locked in the steering neutral position, toeing adjustment for the wheels and spoke angle adjustment for the steering wheel can easily be effected in a short interval of time. The invention is particularly useful when embodied in a steering system for steering both front and rear wheels.

FIGS. 7 through 10 illustrate a rear steering mechanism according to another embodiment of the present invention.

Figure 7:
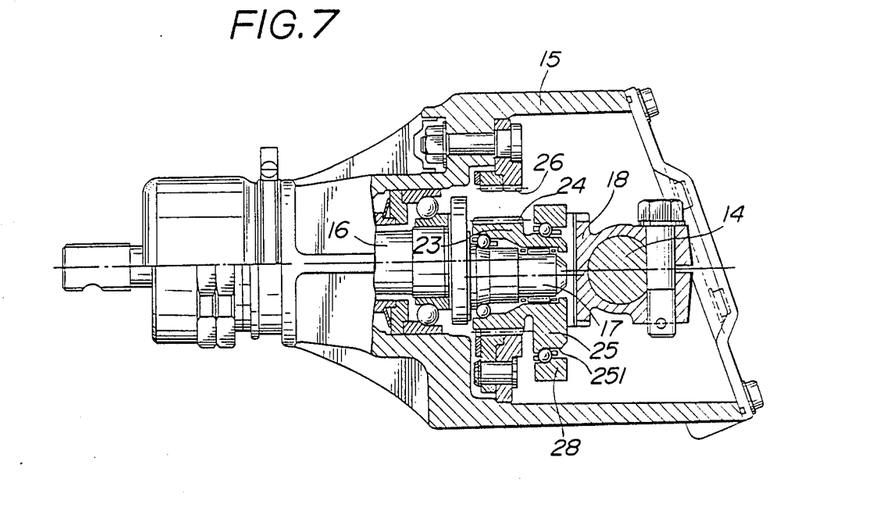
FIG. 7 is a vertical cross-sectional view of a rear steering gear box according to another embodiment of the present invention.
Figure 8:
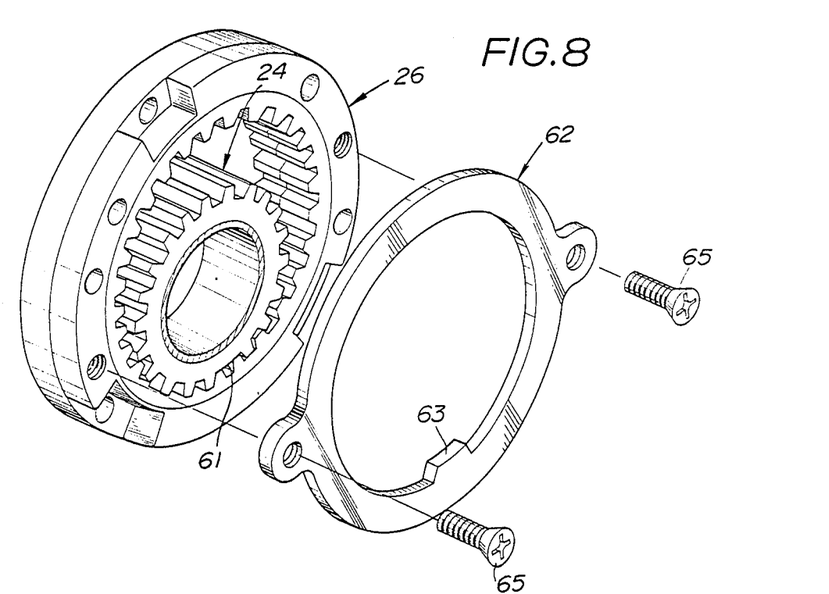
FIG. 8 is an exploded perspective view of a pinion and an internal ring gear.

The rear steering mechanism of this embodiment is also centered while the eccentric shaft 17 is positioned vertically below the input shaft 16, the pinion 24 is in mesh with the lowermost portion of the internal ring gear 26, and the eccentric cam 25 has its lobe 251 directed downwardly, as shown in FIGS. 7 and 8.

In this embodiment, the pinion 24 and the internal ring gear 26 have a gear ratio of 3 : 4. The front steering mechanism and the linkage mechanism are arranged such that when the steering wheel is turned clockwise, for example, from the neutral position, the pinion 24 revolves clockwise in the ring gear 26 as shown in FIG. 10, and when the steering wheel is turned counterclockwise from the neutral position, the pinion 24 revolves counterclockwise in the ring gear 26.

Figure 9:
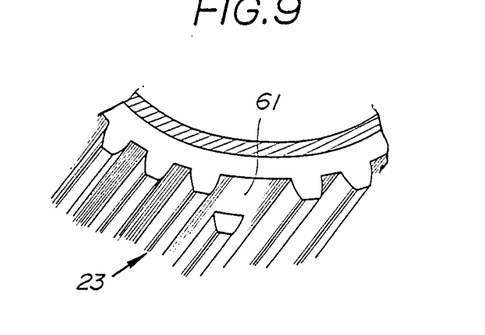
FIG. 9 is a fragmentary perspective view of a tooth-free area of the pinion.
Figure 10:
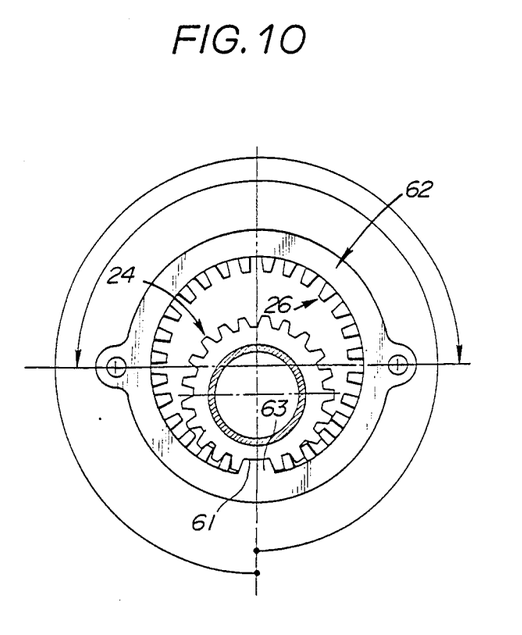
FIG. 10 is a rear elevational view of the pinion and the internal ring gear.

As shown in FIGS. 8 through 10, the pinion 24 has a tooth-free area 61 and the internal ring gear 26 has a projection 63. More specifically, the tooth-free area 61 is defined at the rear end of the tooth located in the lowermost portion of the pinion 24 when it is in the neutral steering position as shown in FIG. 9. The outer periphery of the rear end of the pinion 24 projects from the rear surface of the ring gear 26. A ring plate 62 is fastened by screws 65 to the rear surface of the ring gear 26, the ring plate 62 having an inside diameter equal to the diameter of the root circle of the ring gear 26. The projection 63 is formed on the lowermost portion of the inner periphery of the ring plate 62 and is positioned in the tooth-free area 61 between the adjacent teeth of the pinion 24.

The projection 63 engages in the tooth-free area 61 only in the neutral steering position. Therefore, the neutral steering position can easily be established by bringing the projection 63 into the tooth-free area 61, thereby positioning the pinion 24 and the internal ring gear 26 relatively to each other. More specifically, as descried above, the gear ratio between the pinion 24 and the internal ring gear 26 is 3 : 4. When the pinion 24 revolves ¾ of a turn within the internal ring gear 26 from the neutral steering position, the pinion 24 rotates one full revolution about its own axis. The pinion 24 cannot revolve further within the internal ring gear 26 beyond the ¾-turn position since the pinion 24 abuts against the projection 63 on the lowermost portion of the ring gear 26 and cannot go over the projection 63. No further revolution of the pinion 24 is thus allowed in that direction.

The projection 63 may be formed directly on the ring gear 26 itself. The tooth-free area 61 may be formed in the ring gear 26, and the projection 63 may be formed on the pinion 24.

With the embodiment of FIGS. 7 through 10, the projection 63 and the tooth-free area 61 permit the neutral steering position to be easily established, and are effective in preventing the pinion 24 from revolving excessively with respect to the internal ring gear 26.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A steering system for a motor vehicle, comprising:
   a steering wheel;
   a steering assembly for steering vehicle wheels in response to angular movement of said steering wheel,
   said steering assembly including a front wheel steering mechanism and a rear wheel steering mechanism mechanically connected to each other; and
   a centering mechanism mounted on at least a portion of said steering assembly for establishing a neutral steering position of said steering assembly while said steering assembly is being assembled and serviced.

2. A steering system according to claim 1, wherein said front wheel steering mechanism and said rear wheel steering mechanism have respective steering gear boxes, said centering mechanism being disposed in the steering gear box of said rear wheel steering mechanism.

3. A steering system according to claim 2, wherein said centering mechanism comprises a locking mechanism for locking operation of said steering assembly in the neutral steering position.

4. A steering system according to claim 3, wherein said locking mechanism comprises an engaging portion engageable with a locking device outside of the steering gear box of said rear wheel steering mechanism.

5. A steering system according to claim 4, wherein said rear wheel steering mechanism includes an input shaft having a flange, said engaging portion being a recess defined in an outer periphery of said flange.

6. A steering system according to claim 4, wherein said front and rear steering mechanisms have output and input shafts, respectively, which are mechanically interconnected by a linkage shaft, said locking mechanism being disposed at said input shaft.

7. A steering system according to claim 4, wherein said locking mechanism has a guide hole through which at least a portion of said locking device is inserted.

8. A steering system for a motor vehicle, comprising:
   a steering wheel;
   a steering assembly for steering vehicle wheels in response to angular movement of said steering wheel; and
   a centering mechanism mounted on at least a portion of said steering assembly for establishing a neutral steering position of said steering assembly;
   said steering assembly comprises a front wheel steering mechanism and a rear wheel steering mechanism which have respective steering gear boxes and are mechanically connected to each other, said centering mechanism being disposed in the steering gearbox of said rear wheel steering mechanism;
   said front and rear wheel steering mechanisms include output and input shafts, respectively, which are mechanically interconnected by a linkage shaft, said rear wheel steering mechanism further including an eccentric shaft on said input shaft, a pinion rotatably fitted over said eccentric shaft, an eccentric member integral with said pinion, an internal ring gear meshing with the pinion and fixedly mounted in said steering gearbox of said rear wheel steering mechanism, and a joint member engaging said eccentric member and connecting tie rods for supporting rear wheels, respectively; and
   said centering mechanism comprising a tooth-free area on said pinion and a projection disposed on said internal ring gear and engagable in said tooth-free area only in the neutral steering position.

9. A steering system for a motor vehicle, comprising:
   a steering wheel;
   a steering assembly for steering vehicle wheels in response to angular movement of said steering wheel,
   said steering assembly including a front wheel steering mechanism and a rear wheel steering mechanism mechanically connected to each other; and
   a locking mechanism disposed at least one of said steering mechanisms for locking operation thereof in a neutral steering position while said steering assembly is being assembly and serviced,
   said locking mechanism having an engaging portion engageable with a locking device outside of said steering assembly.

10. A steering mechanism for a motor vehicle, comprising:
    a steering wheel;
    a steering assembly for steering vehicle wheels in response to angular movement of said steering wheel; and
    a centering mechanism mounted on at least a portion of said steering assembly for establishing a neutral steering position of said steering assembly;
    said steering assembly including a front wheel steering mechanism having a steering gear box, and said centering mechanism being disposed in the steering gear box of said front wheel steering mechanism.

* * * * *

UNITED STATES PATENT AND TRADEMARK OFFICE
CERTIFICATE OF CORRECTION

PATENT NO. : 4,790,551

DATED : December 13, 1988

INVENTOR(S) : Ukai et al.

It is certified that error appears in the above-identified patent and that said Letters Patent is hereby corrected as shown below:

Column 1, line 59, change "accomplished" to --accomplish--.
Column 2, line 47, after "engaging" (first occurrence) change "a" to --an--.
Column 3, line 11, after "lobe" change "25" to --251--.
Column 4, line 18, change "afosaid" to --aforesaid--.
Column 6, line 42 (claim 9, line 9), after "disposed at" insert --at--;
         line 45 (claim 9, line 12), change "assembly" to --assembled--.

Signed and Sealed this

Sixteenth Day of May, 1989

Attest:

DONALD J. QUIGG

Attesting Officer

Commissioner of Patents and Trademarks